United States Patent
Mascioli et al.

(10) Patent No.: US 9,882,481 B2
(45) Date of Patent: Jan. 30, 2018

(54) METHOD AND APPARATUS FOR LIMITING INRUSH CURRENT DURING STARTUP OF A BUCK CONVERTER

(71) Applicant: Infineon Technologies Austria AG, Villach (AT)

(72) Inventors: Matthew Mascioli, Marina del Rey, CA (US); Mattia Oddicini, Duisburg (DE); Herbert Zojer, Torrance, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/200,882

(22) Filed: Jul. 1, 2016

(65) Prior Publication Data

US 2018/0006560 A1    Jan. 4, 2018

(51) Int. Cl.
*H02M 3/158* (2006.01)
*H02M 1/36* (2007.01)

(52) U.S. Cl.
CPC ............. *H02M 3/158* (2013.01); *H02M 1/36* (2013.01)

(58) Field of Classification Search
CPC ................................ H02M 3/158; H02M 1/36
See application file for complete search history.

(56) References Cited

U.S. PATENT DOCUMENTS

| | | | | |
|---|---|---|---|---|
| 7,034,586 B2* | 4/2006 | Mehas | ..................... | H02M 1/36 323/901 |
| 7,038,514 B2* | 5/2006 | Leith | ....................... | H02M 1/36 323/901 |
| 8,305,053 B2* | 11/2012 | Truong | .................. | H02M 3/158 323/224 |
| 8,553,375 B2* | 10/2013 | Nguyen | .................. | H02M 1/36 361/18 |
| 2008/0231247 A1* | 9/2008 | Uehara | .................. | H02M 3/158 323/284 |
| 2014/0084884 A1* | 3/2014 | Lee | ........................ | H02M 3/157 323/271 |
| 2014/0292298 A1* | 10/2014 | Pradhan | .............. | H02M 3/1588 323/286 |
| 2016/0380537 A1* | 12/2016 | Bizjak | ................... | H02M 3/156 323/271 |

* cited by examiner

*Primary Examiner* — Emily P Pham
(74) *Attorney, Agent, or Firm* — Murphy, Bilak & Homiller, PLLC (57) ABSTRACT

A method of regulating an output voltage of a buck converter during a startup period in which the buck converter is first enabled includes regulating the output voltage of the buck converter to a reference voltage under current-mode control during a first part of the startup period, and regulating the output voltage of the buck converter to the reference voltage under voltage-mode control during a second, later part of the startup period. The reference voltage ramps up from an initial voltage at the beginning of the startup period to a target voltage at the end of the startup period. Buck converter embodiments are also described.

20 Claims, 4 Drawing Sheets

METHOD AND APPARATUS FOR LIMITING INRUSH CURRENT DURING STARTUP OF A BUCK CONVERTER

TECHNICAL FIELD

The present application relates to buck converters, in particular limiting inrush current during startup of buck converters.

BACKGROUND

Buck converters, including both single-phase and multi-phase buck converters, are widely used in high power applications because of their high efficiency and small amount of area/volume required for implementation. High performance integrated circuits such as microprocessors, graphics processors, network processors, high speed memories, etc. require high current at low voltage. In computing applications, buck converters drive high output capacitance loads such as memory banks like DIMMs (dual in-line memory modules) and/or face very large stringent startup constraints. For example, the output voltage may be regulated to a tight voltage tolerance so as to optimize operation of one or more memory banks. The output load and output capacitance supported by a buck converter often are quite variable. Again in the case of memory banks as the load, the output capacitance depends on whether the memory bank sockets, e.g. typically ranging from 1 to 12 sockets, are populated or unpopulated. The output power therefore can be quite variable depending on system loading, so that the input power available may be heavily constrained, and its capability may be easily exceeded.

During the start-up period of a buck converter, high output capacitance results in a very slow response system. Standard fast compensation schemes issue larger PWM (pulse width modulation) pulses for delivering more current to charge the high output capacitance. This is seen as an "in-rush" current. The larger the output capacitance, the larger the in-rush current. Eventually, the voltage across the output capacitance reaches a soft-start reference voltage. A degree of overshoot may be observed due to the output inductor(s) of the buck converter continuing to charge the output capacitance, even though there is an absence of PWM activity. That is, the in-rush current surges into the system and causes the output voltage to rise at a faster rate than programmed and therefore the output voltage does not rise from 0V to the final set-point voltage at a constant rate. A large amount of inrush current also increases the risk of triggering system shutdown due to overcurrent protection.

One typical solution for reducing the impact of inrush current and for resolve overcurrent protection faults during buck converter start-up is to reduce the (slew) rate at which the target voltage increases. This approach provides a slower moving reference for the output voltage to track, requiring less output current. The reduction in slew-rate slightly reduces the peak required, but the inrush current is still present. Moreover, a reduced slew-rate principally affects the steady-state current required to charge the output capacitance and not the initial start-up period. In another approach, a hard limit is set on the amount of peak-current the control system allows through the switching power-stage. However, this approach requires a very low peak-current limit which impedes voltage regulation during normal transient conditions. Also, the system has a poor recovery/response once the output voltage reaches the target level. Still other approaches involve increasing or over-designing power system capability which presents inefficiencies during regular operation, and/or limiting the number of memory modules or output capacitance which restricts the end application.

As such, there is a need for improved inrush current limiting techniques during startup of buck converters.

SUMMARY

According to an embodiment of a method of regulating an output voltage of a buck converter during a startup period in which the buck converter is first enabled, the method comprises: regulating the output voltage of the buck converter to a reference voltage under current-mode control during a first part of the startup period; and regulating the output voltage of the buck converter to the reference voltage under voltage-mode control during a second, later part of the startup period. The reference voltage ramps up from an initial voltage at the beginning of the startup period to a target voltage at the end of the startup period.

According to an embodiment of a buck converter, the buck converter comprises a power stage operable to deliver current to an output capacitance coupled to the buck converter and a controller operable to control switching of the power stage, including during a startup period in which the buck converter is first enabled, so as to regulate an output voltage of the buck converter. During the startup period, the controller is operable to regulate the output voltage to a reference voltage under current-mode control during a first part of the startup period and regulate the output voltage to the reference voltage under voltage-mode control during a second, later part of the startup period. The controller is further operable to ramp up the reference voltage from an initial voltage at the beginning of the startup period to a target voltage at the end of the startup period.

According to another embodiment of a buck converter, the buck converter comprises a first control loop operable to regulate a first output voltage of the buck converter and a second control loop operable to regulate a second output voltage of the buck converter independent of the first control loop. The second control loop is operable to use the first output voltage as a reference voltage during a startup period in which the buck converter is first enabled. During the startup period, the second control loop is operable to regulate the second output voltage to the reference voltage under current-mode control during a first part of the startup period and regulate the second output voltage to the reference voltage under voltage-mode control during a second, later part of the startup period. The first control loop is further operable to ramp the first output voltage from an initial voltage at the beginning of the startup period to a target voltage at the end of the startup period.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide a mechanism for controlling current supplied by a buck converter to a high capacitance load such as a bank of memory modules or other types of integrated circuits with high output capacitance, and for controlling current supplied by a buck converter to a load during instances of rapidly increasing output voltage start-up rates. The startup period is of particular significance because of the current required to charge the output capacitance and the desire to have the fastest slew rate possible. The embodiments described herein allow for reduced constraints in the input power supply, filter and decoupling requirements, and yield performance improvements which manifest as increased margin, more robust operation, and/or reduced system cost, power dissipation, and solution size. The embodiments described herein provide a mechanism for configuring or setting a peak-current limit threshold during the startup period of a buck converter, and for dynamically changing or adjusting the peak-current limit threshold during the startup period to control inrush current. The peak-current limit is set low initially and then, either by means of a ramping mechanism or in a single step, is increased to a higher value which is suitable for normal periods of operation.

Figure 1:
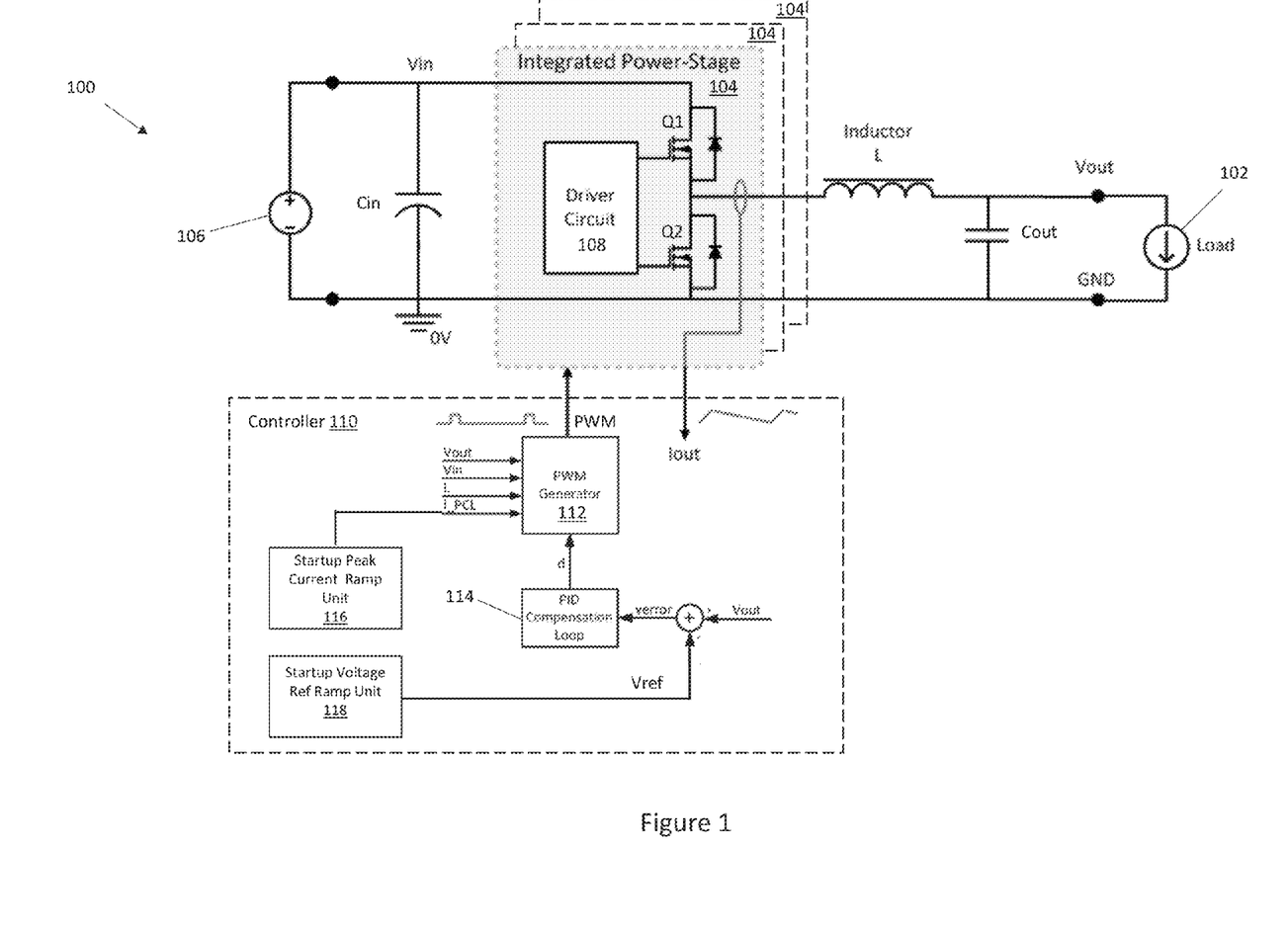
FIG. 1 illustrates a block diagram of an embodiment of a buck converter configured to limit inrush current during startup.

FIG. 1 illustrates an embodiment of a buck converter 100 configured to regulate one or more voltages applied to a load 102 that requires high current at low voltage and/or has a high output capacitance. In the case of a load with high output capacitance, the output capacitance may be in the microfarad range. The load 102 is illustrated generically in FIG. 1 as a current sink, and can be any type of load that requires high current at low voltage and/or has a high output capacitance e.g. such as one or more microprocessors, graphics processors, network processors, a bank of memory modules, etc.

The buck converter 100 includes one or more power stages 104 for powering the load 102. In the case of a single-phase buck converter, a single power stage is provided. In the case of a multi-phase buck converter, a power stage is provided for each phase of the converter. Each power stage 104 delivers a phase current (Iout) through an output inductor (L) to the output capacitance of the load 102 coupled to the buck converter 100. One or more input capacitors (Cin) filter the input current so that the current from the host source 106 is approximately an average current. One or more output capacitors (Gout) maintain a constant output voltage (Vout) and limit voltage spikes at the converter output.

Each power stage 104 coupled to the output capacitor(s) Cout through a corresponding output inductor L has a high-side transistor Q1 and a low-side transistor Q2. The high-side transistor of each power stage 104 switchably connects the load 102 to an input voltage (Vin) of the buck converter 100 and the corresponding low-side transistor switchably connects the load 104 to ground at different periods. Each power stage 104 includes active semiconductor components such as MOSFETs (metal oxide semiconductor field effect transistors), drivers 108, etc, and corresponding passive components. The power stage components can be integrated on the same or different semiconductor dies. In general, each power stage 104 includes the components needed to provide an output phase of the buck converter 100 to the load 102.

The buck converter 100 also includes a controller 110 such as a microcontroller, microprocessor, ASIC (application-specific integrated-circuit), etc. operable to control switching of each power stage 104, including during a startup period in which the buck converter 100 is first enabled, so as to regulate the output voltage Vout of the buck converter 100. The controller 110 regulates the voltage Vout by adjusting the phase current(s) delivered to the load 102. The controller 110 includes a pulse width modulator (PWM) unit 112 for switching the transistors of each power stage 104 via corresponding PWM control signals (PWM), so that each power stage 104 sources or sinks current to the load 104, or is otherwise inactive.

For example, when the PWM control signal for a particular power stage 104 is at a logic level high, the high-side transistor Q1 is placed in a conductive state, the inductor current is sourced or sunk through the high-side transistor Q1, and the current through the inductor increases for the duration. This is generally referred to as the 'on-time' and the power stage 104 is considered to be 'turned on'. When the PWM control signal is at a logic level low, the corresponding low-side transistor Q2 is placed in a conductive state, current is sourced or sunk from the low-side transistor Q2, and the current through the inductor decreases for the duration. This is generally referred to as the 'off-time' and the power stage 104 is considered to be 'turned off'. When the PWM control signal is at a trivalent or high impedance logic level (the PWM control signal is neither high nor low), both the high-side and the low-side transistors Q1, Q2 are placed in a non-conductive state, current is sourced or sunk through either the low-side or high side transistor body diodes, and the magnitude of the current through the inductor decreases towards zero. This is generally referred to as the 'HiZ-time' or 'inactive time' and the power stage 104 is considered to be in 'High Z' or inactive.

The PWM unit 112 generates the PWM control signals as a function of the output voltage Vout, input voltage Vin, output inductance L and a peak-current limit threshold (I_PCL). If the output current Iout of a power stage 104 exceeds the peak-current limit threshold I_PCL, the corresponding PWM signal is deactivated. During standard operation, which occurs after the buck converter 100 exits startup, the peak-current limit threshold I_PCL is typically fixed and is set to a value that prevents damage to the buck converter caused by an excessive current condition. These and other aspects of PWM control of buck converters are well known during standard operation, and therefore no further explanation is given in this regard.

The driver circuitry 108 of each power stage 104 provides respective gate drive signals G1, G2 to the gates of the high-side and low-side transistors Q1, Q2 of the power stage 104 in response to the PWM control signals generated by the PWM unit 112. The activation state of each power stage phase and duty cycle of the corresponding high-side and low-side transistors Q1, Q2 are determined at least in part based on the output voltage Vout applied to the load 102, so that the buck converter 100 can react as quickly and reliably as possible to changing load conditions.

The controller 110 can manage changes from one reference voltage to another during standard operation, which occurs after the buck converter 100 exits startup. The controller 110 can also determine errors between the output voltage Vout and a reference voltage (Vref), and convert the error voltage into a digital representation provided to the PWM unit 112 of the controller 110 for modifying the switching cycle of power stage transistors Q1, Q2 during standard operation e.g. by adjusting the duty cycle. For example, the controller 110 can include a PID (proportional-integral-derivative) compensation loop 114 for generating duty cycle adjustment information (d) for the PWM unit 112 based on the difference (Verror) between Vout and Vref. The reference voltage Vref is typically fixed during standard operation, but can be changed to a new value in response to a command or instruction from the load 102. Such voltage regulation functions are standard in typical digitally-controlled switching voltage regulators, and therefore no further explanation is given in this regard.

In addition to regulating the voltage Vout delivered to the load 102 during standard operation, the controller 110 also regulates the output voltage Vout during the startup period when the buck converter 100 is first enabled. The controller 110 provides a mechanism for configuring or setting the peak-current limit threshold I_PCL during the startup period, and for dynamically changing or adjusting the peak-current limit threshold I_PCL during the startup period so as to limit the inrush current.

Figure 2:
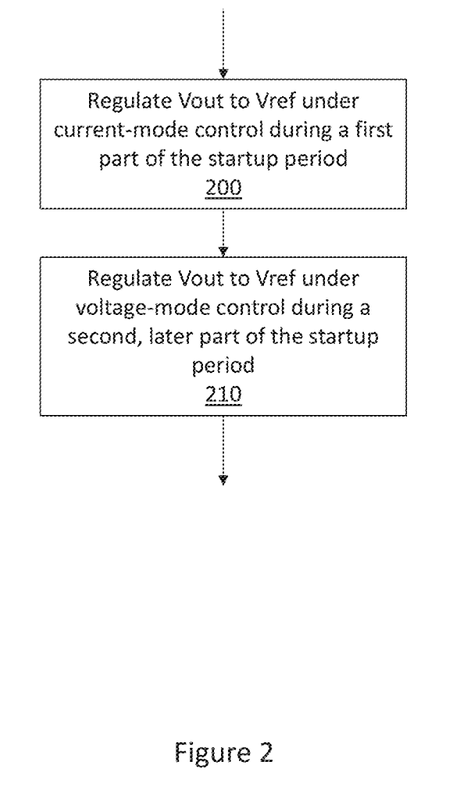
FIG. 2 illustrates a flow diagram of an embodiment of a method of limiting inrush current during startup of a buck converter.

FIG. 2 illustrates a flow diagram of a method of regulating the output voltage Vout of the buck converter 100 during the startup period. The controller 110 regulates Vout to a reference voltage Vref under current-mode control during a first (earlier) part of the startup period (Block 200). In current-mode control, the controller 110 regulates the phase current Iout through the corresponding output inductor L first and Vout second. During a second (later) part of the startup period, the controller 110 regulates Vout to Vref under voltage-mode control (Block 210). In voltage-mode control, the controller 110 regulates Vout and regulates different load current demands based on what is observed at the output node. During the startup period, the controller 110 internally ramps up Vref from an initial voltage e.g. 0V at the beginning of the startup period to a target voltage (Vtgt) at the end of the startup period. The final value of the target voltage Vtgt may be defined by the load 104, or programmed into the controller 110. The controller 110 similarly ramps up the peak-current limit threshold I_PCL during the startup period so as to enable a switchover from current-mode control to voltage-mode control before Vout reaches the final target voltage Vtgt indicated by Vref.

Current-mode control is a function of the peak current limit, which is dynamically adjusted by the controller 110 during the startup period. When engaged in current-mode control, the peak-current limit slows down the ability of the controller 110 to track Vout to Vref. The greater the output capacitance, the more current needed to bring up Vout. Eventually the controller 110 increases the peak-current limit to a level such that the rate of change for Vout is faster than that of Vref. At this point, a switchover to voltage-mode control automatically occurs, and Vout eventually catches up to Vref. The buck converter 100 can be tuned to automatically switch over from current-mode control to voltage-mode control when the positive current limit no longer clamps the current delivered by the buck converter 100 to the output capacitance of the load 102.

Returning to FIG. 1, the controller 110 includes a peak-current limit ramp unit 116 and a reference voltage ramp unit 118 for implementing the startup voltage regulation method illustrated in FIG. 2. Operation of the peak-current limit ramp unit 116 and the reference voltage ramp unit 118 is described next with reference to FIG. 3, which illustrates the reference voltage output (Vref) of the reference voltage ramp unit 118 and the peak-current limit output (I_PCL) of the peak-current limit ramp unit 116 during the startup period.

Figure 3:
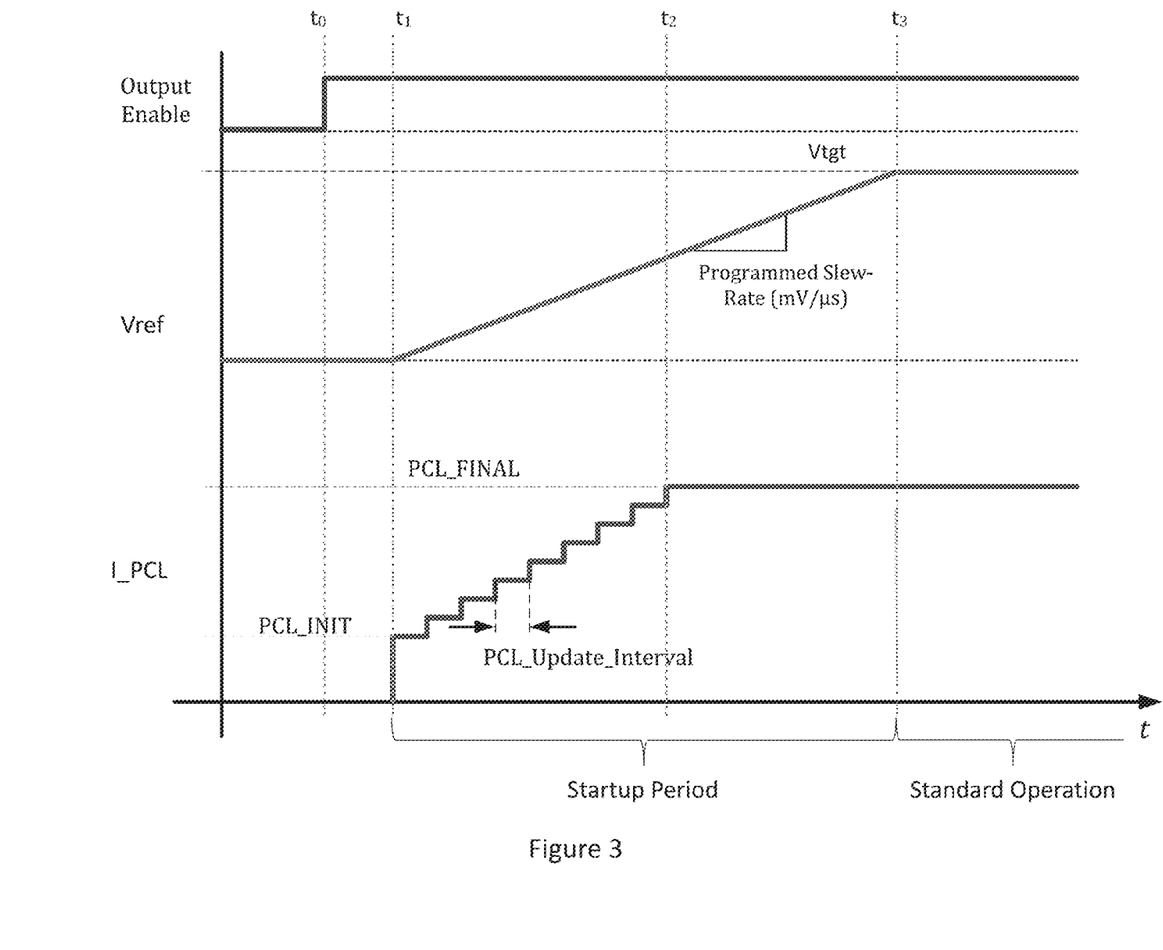
FIG. 3 illustrate various waveforms associated with startup of the buck converter of FIG. 1.

Startup of the buck converter 110 is detected at time t0 in FIG. 3, responsive to an output enable signal provided to the buck converter 100 being activated. The initial peak-current limit (PCL_INIT) and the slew rate of Vref are programmable settings. The peak-current limit I_PCL is initially set to PCL_INIT at time t1 in FIG. 3. Also at time 0, the reference voltage ramp unit 118 begins to ramp Vref at its programmed slew rate. The reference voltage Vref internally generated by the reference voltage ramp unit 118 is fed to the PID compensation loop 114 which compares Vref to the buck converter output voltage Vout. The reference voltage Vref continues to ramp at the predetermined slew rate after time t1, and the peak-current limit ramp unit 116 increases I_PCL from PCL_INIT to a final value (PCL_FINAL) during the startup period. The final value PCL_FINAL of the peak-current limit I_PCL represents the operating point of the buck converter 100, and depends on the output inductor parameters. The difference between time t0 and time t1 in FIG. 3 represents computational delay of the controller 110.

The slew rate of Vref effects the point at which the peak-current limit I_PCL is no longer clamping the amount of current delivered to the output capacitance of the load 102. For larger output capacitances e.g. in the microfarad range, a greater amount of current is required to increase the output voltage at a specified rate. A faster rate of increase of the output voltage also requires larger current for a fixed output capacitance. During the startup period; the PWM unit 112, in conjunction with the peak-current limit and reference voltage ramp units 116, 118, limit the output current for instances of high output capacitance or fast output voltage start-up rates. During the startup period and in standard operation, the PWM unit 112 uses knowledge of the output voltage Vout, input voltage Vin, and the output inductance to truncate the outgoing PWM signals so as to limit the amount of current through a power-stage 104 as previously explained herein. During the startup period, the peak-current limit I_PCL is dynamically ramped by the peak-current limit ramp unit 116. Also, the profile of the output current Iout is not directly modified by the slew rate of Vref.

In one embodiment, the slew rate of Vref is set such that the output voltage Vout of the buck converter 100 catches up to Vref before Vref is fully ramped to the target voltage Vtgt at the end of the startup period which occurs at time t3 in FIG. 3. In another embodiment, the slew rate of Vref is set such that before Vref is fully ramped to the target voltage Vtgt at the end of the startup period, the positive current limit I_PCL no longer clamps the current delivered by the buck converter 100 to the output capacitance of the load 102.

A defined relationship exists between the peak-current limit I_PCL and the slew rate of Vref. I_PCL limits how the controller 110 tracks Vref. By slowing the slew rate of Vref, the point where I_PCL is released occurs earlier in the startup period. A faster slew rate takes longer for Vout to catch up and reach Vref, while a slower slew rate may be more within the physical capability of the controller 110 and therefore Vout will catch up to Vref sooner than with a faster slew rate. Preferably, Vout catches up to Vref earlier in the Vref ramp. With too fast of a Vref slew rate, Vout never catches up to Vref and therefore the controller 110 will always be in current-mode control. As such, Vref slew rate is an important factor in tuning the entire system. Vref slew rate is preferably set so that Vout reaches (catches up to) Vref before Vref reaches its end target (steady-state) value Vtgt. The controller 110 automatically exits current-mode control at this point, and enters voltage-mode control.

In addition to the Vref slew rate, the peak-current limit ramp profile also is an important factor. During the startup period, the peak-current limit ramp unit 116 increases the peak-current limit I_PCL according to a specified update interval (PCL_Update_Interval) programmed into the controller 110. In one embodiment, the positive current limit I_PCL of the buck converter 100 is increased in a stepwise linear manner during the startup period e.g. as shown in FIG. 3. In addition, or alternatively, I_PCL can be increased periodically during the startup period also as shown in FIG. 3. In one embodiment, I_PCL can be increased every nth switching cycle of the buck converter 100 during the startup period, n being a positive integer. For example, I_PCL can be increased every 2 switching cycles, every 16 switching cycle, every 32 switching cycles, etc. The overall slope of I_PCL remains the same during the startup period regardless of the rate of increase in I_PCL. However, the coarseness of I_PCL depends on the frequency of the adjustment period. In one embodiment, the positive current limit I_PCL is increased by at least one ampere every switching cycle of the buck converter 100 during the startup period. The initial value PCL_INIT of the peak-current I_PCL can also be modified. For example, PCL_INIT may range from 20 A to 40 A, or higher or lower, depending on the type of application in which the buck converter 100 is to be deployed. Values for PCL_INIT, PCL_FINAL, PCL_Update_Interval, Vref slew rate, etc, are programmable and therefore can be determined based on the end application.

At time t2 in FIG. 3, the peak-current limit I_PCL reaches its final programmed value PCL_FINAL and the peak-current limit ramp unit 116 stops further ramping of I_PCL. However, the soft-start ramp of Vref continues at its programmed slew rate until Vref reaches its programmed (final) target value Vtgt. At time t3 in FIG. 3, Vout reaches Vtgt and the buck converter 100 exits the startup period. The reference voltage ramp unit 118 can continue to set the reference Vref to which Vout is regulated after exiting the startup period as shown in FIG. 1, or instead a different unit of the controller 110 can set Vref during standard operation.

Heretofore, buck converter embodiments have been described in the context of a generic load that requires high current at low voltage and/or has a high output capacitance. Described next is a buck converter embodiment in which the buck converter powers a memory system having one or more memory modules.

Figure 4:
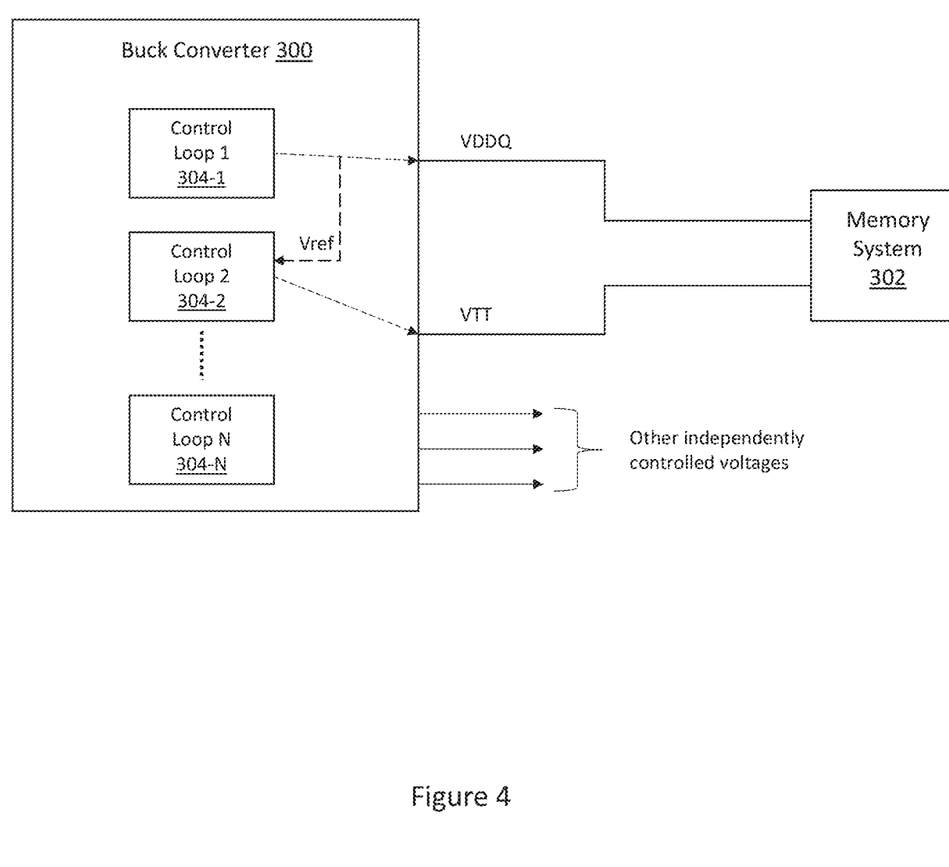
FIG. 4 illustrates a block diagram of an embodiment of a buck converter coupled to a memory system and having a multi-loop controller configured to limit inrush current during startup.

FIG. 4 illustrates such a buck converter 300 and memory system 302. The buck converter 300 includes a plurality of control loops 304, each of which is operable to independently regulate a different output voltage of the buck converter 300. Each control loop 304 includes the PWM unit 112 and the PID compensation loop 114 illustrated in FIG. 1. Each control loop 304 also includes the peak-current limit and reference voltage ramp units 116, 118 also illustrated in FIG. 1; and is operable to perform the startup period voltage regulation functions as previously described herein.

In more detail, a first one of the control loops 304-1 regulates a first output voltage (VDDQ) of the buck converter 300 and a second one of the control loops 304-2 regulates a second output voltage (VTT) of the buck converter 300 independent of the first control loop. The second control loop 304-2 is uses the first output voltage VDDQ as a reference voltage (previously described as 'Vref') during the startup period in which the buck converter 300 is first enabled. During the startup period, the second control loop 304-2 regulates the second output voltage VTT to VDDQ under current-mode control during a first part of the startup period, and regulates VTT to VDDQ under voltage-mode control during a second, later part of the startup period e.g. as illustrated in the method flow diagram of FIG. 2.

In more detail, the reference voltage ramp unit 118 of the first control loop 304-1 ramps the first output voltage VDDQ from an initial voltage at the beginning of the startup period to a target voltage at the end of the startup period, so as to provide the startup target voltage ramping previously described herein. The peak-current limit unit 116 of the second control loop 304-2 configures or sets the peak-current limit threshold during the startup period, and dynamically changes or adjusts the peak-current limit threshold during the startup period so as to control inrush current also as previously described herein. The buck converter 300 thus uses one of its independent output voltages as a reference point, and tracks that voltage in regulating a second one of its independent output voltages during the startup period.

In one embodiment, the first output voltage VDDQ of the buck converter 300 provides a main voltage rail to the memory system 302 and the second output voltage VTT of the buck converter 300 provides a low-power tracking rail to the memory system 302 which follows VDDQ at a pre-defined ratio e.g. 2:1 (e.g. VDDQ=1.2V and VTT=0.6V). Leakage current can occur from one rail to another. The accumulated charge can form a resulting voltage, resulting in a voltage accumulation formed on the reference rail VDDQ. On start-up, this voltage can create a step-change in the reference for the tracking rail VTT. Since the tracking rail VTT is typically very low-power, this step-change causes large amounts of stress and can damage the buck converter 300. Also, when VDDQ has an initial offset ('pre-bias'), the buck converter 300 may attempt to catch up very fast with the tracking rail VTT which can cause peak current spike.

By applying the same startup peak-current limiting technique previously described herein in connection with FIGS. 1-3 to the tracking rail VTT of the buck converter 300 shown in FIG. 4 with VDDQ as the reference voltage, stress on the buck converter 300 is significantly reduced and a monotonically rising tracking rail voltage VTT results. More particularly, by treating VDDQ as a reference voltage ramp akin to Vref previously described herein, VDDQ will have its own internal (soft-start) reference ramp managed by the first control loop 304-1. By treating VTT akin to Vout previously described herein, the second control loop 304-2 will force VTT to follow VDDQ. In this way, the buck converter 300 can independently regulate two or more different output voltages at the same time. In general, the voltage output of one control loop 304 is used as a reference (soft-start) voltage ramp for a different control loop 304. The other control loop 304 tracks its voltage output to the first voltage output, by dynamically changing or adjusting the peak-current limit threshold during the startup period to control inrush current. The peak-current limit can be controlled and adjusted by configuring an initial value (e.g. PC_INIT in FIG. 3), a final value (e.g. PC_FINAL in FIG. 3) and an update rate value (e.g. PCL_Update_Interval) of the peak-current limit. The transition between current-mode control where the peak-current limit protection is actively clamping and voltage-mode control where the peak-current limit is released is distinct, but smooth and monotonic. In general, the multi-loop controller used in the buck converter 300 of FIG. 4 is a digital controller which can implement multiple voltage rails of different topologies at different voltage and power levels on the same semiconductor die (chip).

The embodiments described herein provide a buck converter and method for dynamically controlling the peak-current delivered to a load during start-up conditions. The load can be of large capacitance such as a bank of memory modules, can be of large capacitance due to the placement of discrete components, etc. The load can also require large peak-currents due to rapid changes in output voltage start-up rates, such as the impact of pre-bias conditions on a tracking rail. The controller embodiments described herein dynamically configures the peak-current limit during the start-up period of operation, yielding improved reliability and performance by reducing peak-current stresses on semiconductor components and limiting the risk of start-up failures.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of regulating an output voltage of a buck converter during a startup period in which the buck converter is first enabled, the method comprising:
    regulating the output voltage of the buck converter to a reference voltage under current-mode control during a first part of the startup period; and
    regulating the output voltage of the buck converter to the reference voltage under voltage-mode control during a second, later part of the startup period,
    wherein the reference voltage ramps up from an initial voltage at a beginning of the startup period to a target voltage at an end of the startup period.

2. The method of claim 1, wherein regulating the output voltage of the buck converter to the reference voltage under current-mode control during the first part of the startup period comprises:
    ramping the reference voltage at a predetermined slew rate during the startup period; and
    increasing a positive current limit of the buck converter from an initial value to a final value during the startup period.

3. The method of claim 2, wherein the positive current limit of the buck converter is increased in a stepwise linear manner during the startup period.

4. The method of claim 2, wherein the positive current limit of the buck converter is increased periodically during the startup period.

5. The method of claim 4, wherein the positive current limit of the buck converter is increased every nth switching cycle of the buck converter during the startup period, n being a positive integer.

6. The method of claim 5, wherein the positive current limit of the buck converter is increased by at least one ampere every switching cycle of the buck converter during the startup period.

7. The method of claim 2, wherein the slew rate of the reference voltage is set such that the output voltage of the buck converter catches up to the reference voltage before the reference voltage is fully ramped to the target voltage at the end of the startup period.

8. The method of claim 2, wherein the buck converter delivers current to an output capacitance of a load coupled to the buck converter, and wherein the slew rate of the reference voltage is set such that before the reference voltage is fully ramped to the target voltage at the end of the startup period, the positive current limit no longer clamps the current delivered by the buck converter to the output capacitance.

9. The method of claim 8, wherein the buck converter tuned to automatically switch over from current-mode control to voltage-mode control when the positive current limit no longer clamps the current delivered by the buck converter to the output capacitance.

10. A buck converter, comprising:
    a power stage operable to deliver current to an output capacitance coupled to the buck converter; and
    a controller operable to control switching of the power stage, including during a startup period in which the buck converter is first enabled, so as to regulate an output voltage of the buck converter,
    wherein during the startup period, the controller is operable to regulate the output voltage to a reference voltage under current-mode control during a first part of the startup period and regulate the output voltage to the reference voltage under voltage-mode control during a second, later part of the startup period,
    wherein the controller is further operable to ramp up the reference voltage from an initial voltage at a beginning of the startup period to a target voltage at an end of the startup period.

11. The buck converter of claim 10, wherein the controller is operable to ramp the reference voltage at a predetermined slew rate during the startup period and increase a positive current limit of the buck converter from an initial value to a final value during the startup period.

12. The buck converter of claim 11, wherein the controller is operable to increase the positive current limit in a stepwise linear manner during the startup period.

13. The buck converter of claim 11, wherein the controller is operable to periodically increase the positive current limit during the startup period.

14. The buck converter of claim 13, wherein the controller is operable to increase the positive current limit every nth switching cycle of the buck converter during the startup period, n being a positive integer.

15. The buck converter of claim 14, wherein the controller is operable to increase the positive current limit one ampere every switching cycle during the startup period.

16. The buck converter of claim 11, wherein the controller is operable to set the slew rate of the reference voltage such that the output voltage catches up to the reference voltage before the reference voltage is fully ramped to the target voltage at the end of the startup period.

17. The buck converter of claim 11, wherein the controller is operable to set the slew rate of the reference voltage such that before the reference voltage is fully ramped to the target voltage at the end of the startup period, the positive current limit no longer clamps the current delivered by the buck converter to the output capacitance.

18. The buck converter of claim 17, wherein the buck converter is tuned to automatically switch over from current-mode control to voltage-mode control when the positive current limit no longer clamps the current delivered by the buck converter to the output capacitance.

19. The buck converter of claim 11, wherein the controller is a PID (proportional-integral-derivative) based controller operable to generate PWM (pulse width modulation) pulses for controlling the switching of the power stage, and wherein the PID-based controller is operable to adjust the width of the PWM pulses during the startup period so that the current delivered by the power stage to the output capacitance does not exceed the positive current limit.

20. A buck converter, comprising:
 a first control loop operable to regulate a first output voltage of the buck converter; and
 a second control loop operable to regulate a second output voltage of the buck converter independent of the first control loop,
 wherein the second control loop is operable to use the first output voltage as a reference voltage during a startup period in which the buck converter is first enabled,
 wherein during the startup period, the second control loop is operable to regulate the second output voltage to the reference voltage under current-mode control during a first part of the startup period and regulate the second output voltage to the reference voltage under voltage-mode control during a second, later part of the startup period,
 wherein the first control loop is further operable to ramp the first output voltage from an initial voltage at a beginning of the startup period to a target voltage at an end of the startup period.

* * * * *